(12) United States Patent
Feng et al.

(10) Patent No.: US 9,766,520 B2
(45) Date of Patent: Sep. 19, 2017

(54) ARRAY SUBSTRATE, MANUFACTURING METHOD THEREOF, DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Wei Feng, Beijing (CN); Guangyan Tian, Beijing (CN); Haipeng Yang, Beijing (CN); Xuebing Jiang, Beijing (CN); Xiaoye Ma, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 136 days.

(21) Appl. No.: 14/785,446

(22) PCT Filed: Mar. 18, 2015

(86) PCT No.: PCT/CN2015/074428
§ 371 (c)(1),
(2) Date: Oct. 19, 2015

(87) PCT Pub. No.: WO2016/065805
PCT Pub. Date: May 6, 2016

(65) Prior Publication Data
US 2016/0349580 A1 Dec. 1, 2016

(30) Foreign Application Priority Data

Oct. 27, 2014 (CN) .......................... 2014 1 0582229

(51) Int. Cl.
*G02F 1/155* (2006.01)
*G02F 1/1362* (2006.01)
(Continued)

(52) U.S. Cl.
CPC ...... *G02F 1/136204* (2013.01); *G02F 1/1368* (2013.01); *G02F 1/13439* (2013.01);
(Continued)

(58) Field of Classification Search
CPC ................................................. G02F 1/136204
(Continued)

(56) References Cited

U.S. PATENT DOCUMENTS 6,445,427 B1 * 9/2002 Lee .................... G02F 1/136204
349/40
7,903,186 B2 * 3/2011 Murade ............. G02F 1/136204
345/100
(Continued)

FOREIGN PATENT DOCUMENTS

CN 102023423 A 4/2011
CN 102338959 A 2/2012
(Continued)

OTHER PUBLICATIONS

International Search Report dated Jul. 14, 2015 issued in corresponding International Application No. PCT/CN2015/074428 along with an English translation of the Written Opinion of the International Searching Authority.

*Primary Examiner* — Timothy L Rude
(74) *Attorney, Agent, or Firm* — Nath, Goldberg & Meyer; Joshua B. Goldberg (57) ABSTRACT

The invention discloses array substrate, manufacturing method thereof, display panel and display device, array substrate comprises TFTs, common electrodes, common electrode lines, data lines and gate lines, each TFT com-
(Continued)

prises gate, active layer corresponding to the gate, protective layer corresponding to the gate line or gate, and ESL, the active layer and protective layer are provided in the same layer and separated from each other; the ESL is provided with source holes and drain hole corresponding to the active layer, protective hole corresponding to the protective layer but not overlapping with the data line, and connecting holes corresponding to the common electrode and common electrode line; and distance between each connecting hole and the protective hole closest thereto is smaller than that between the connecting hole and the source or drain hole closest thereto, and/or, diameter of said protective hole is smaller than those of the source and drain holes.

19 Claims, 9 Drawing Sheets (51) Int. Cl.
  *G02F 1/1335* (2006.01)
  *G02F 1/1343* (2006.01)
  *G02F 1/1368* (2006.01)

(52) U.S. Cl.
  CPC .. *G02F 1/133514* (2013.01); *G02F 1/136286* (2013.01); *G02F 1/136227* (2013.01); *G02F 2001/136295* (2013.01); *G02F 2201/121* (2013.01); *G02F 2201/123* (2013.01)

(58) Field of Classification Search
  USPC .............................................. 349/40
  See application file for complete search history.

(56) References Cited

U.S. PATENT DOCUMENTS

| | | | |
|---|---|---|---|
| 7,952,653 B2* | 5/2011 | Tanaka | G02F 1/136204 349/40 |
| 8,085,352 B2* | 12/2011 | Kim | H01L 27/0248 349/40 |
| 8,963,161 B2* | 2/2015 | Murakami | H01L 29/04 257/72 |
| 9,595,545 B2* | 3/2017 | Misaki | H01L 27/1225 |
| 9,703,156 B2* | 7/2017 | Namiki | G02F 1/13458 |
| 2009/0066870 A1 | 3/2009 | Yagi et al. | |
| 2015/0221680 A1* | 8/2015 | Nakata | G02F 1/136204 349/40 |
| 2015/0316824 A1* | 11/2015 | Ohishi | G02F 1/136204 257/72 |

FOREIGN PATENT DOCUMENTS

| | | |
|---|---|---|
| CN | 103838049 A | 6/2014 |
| CN | 104090436 A | 10/2014 |
| CN | 104317089 A | 1/2015 |
| WO | 2012/074000 A1 | 6/2012 |

\* cited by examiner

Fig. 1

(Prior Art)

Fig. 2

(Prior Art)

ARRAY SUBSTRATE, MANUFACTURING METHOD THEREOF, DISPLAY PANEL AND DISPLAY DEVICE

This is a National Phase Application filed under 35 U.S.C. 371 as a national stage of PCT/CN2015/074428, filed Mar. 18, 2015, an application claiming the benefit of Chinese Application No. 201410582229.0, filed Oct. 27, 2014, the content of each of which is hereby incorporated by reference in its entirety.

FIELD OF THE INVENTION

The present invention relates to the field of liquid crystal display technology, and particularly relates to an array substrate, a manufacturing method thereof, a display panel comprising the array substrate and a display device comprising the display panel.

BACKGROUND OF THE INVENTION

In an Advanced Super Dimension Switch (thereinafter, referred to as ADS) mode display device, all liquid crystal molecules located between and right above slit electrodes in a liquid crystal layer are enabled to rotate by means of an electric field generated by edges of the slit electrodes arranged in the same plane and a multi-dimensional electric field formed between a slit electrode layer and a plate electrode layer, so as to improve light transmittance of the liquid crystal layer and achieve a relatively wide angle of view.

Figure 1:
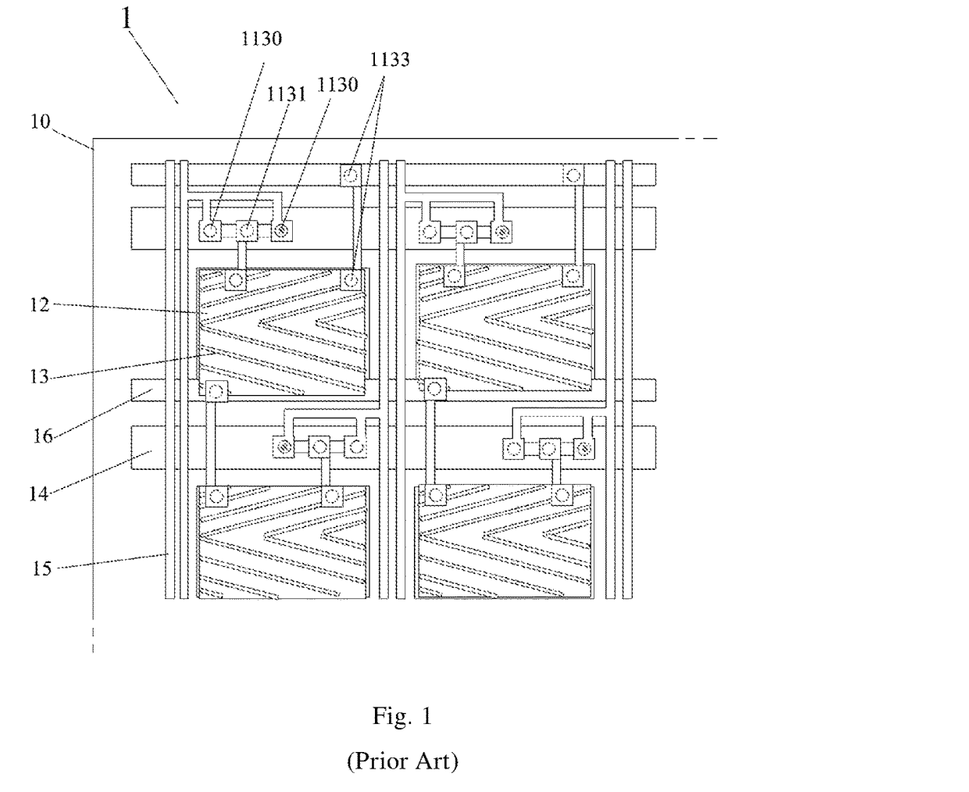
FIG. 1 is a schematic top view of an array substrate in an existing ADS display device.
Figure 2:
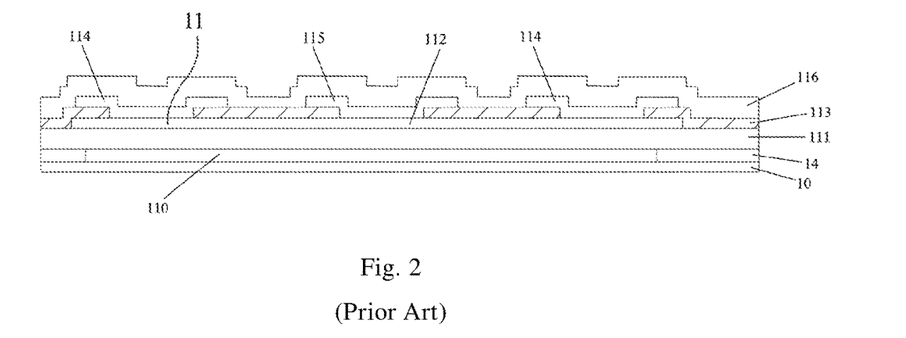
FIG. 2 is a schematic partially cross-sectional diagram of a thin film transistor in the array substrate shown in FIG. 1.

FIG. 1 is a schematic diagram of an array substrate in an existing ADS display device, and in FIG. 1, in order to clearly illustrate a via hole penetrating through an etch stop layer, a structure located above the etch stop layer is not shown, or a portion, located above the via hole, of the structure located above the etch stop layer is not shown; FIG. 2 is a schematic cross-sectional diagram of a thin film transistor in the array substrate shown in FIG. 1. As shown in FIGS. 1 and 2, the array substrate 1 includes a substrate 10 and thin film transistors (TFT) 11, common electrodes 12, pixel electrodes 13, gate lines 14 each used for providing a voltage signal to a gate 110 of the thin film transistor 11, data lines 15 each used for providing a voltage signal to a source 114 of the thin film transistor 11 and common electrode lines 16 each used for providing a voltage signal to the common electrode 12 that are all formed above the substrate 10 (in direct or indirect contact with a surface of the substrate 10). Here, the pixel electrode 13 is located above the common electrode 12 (i.e., the common electrode 12 is located between the pixel electrode 13 and the substrate 10), the common electrode 12 is a plate electrode, and the pixel electrode 13 is a slit electrode. The thin film transistor 11 includes a gate 110, a gate insulation layer 111, an active layer 112, an etch stop layer (ESL) 113, a source 114 and a drain 115, and a passivation layer 116 that are sequentially formed above the substrate 10. Specifically, source holes 1130 and a drain hole 1131 that penetrate through the etch stop layer 113 are formed at positions of the etch stop layer 113 corresponding to the active layer 112, respectively. As shown in FIG. 1, in each thin film transistor 11, there may be two source holes 1130, the source holes 1130 and the drain hole 1131 are commonly referred to as ESL holes, and the source 114 and the drain 115 are formed by depositing a source-drain metal (SD metal) at the source holes 1130 and the drain hole 1131, respectively. The common electrode 12 and the common electrode line 16 may be formed on the surface of the substrate 10. Connecting holes 1133 penetrating through the etch stop layer 113 and the gate insulation layer 111 are formed above both the common electrode line 16 and the common electrode 12, and a conducting wire may be formed by depositing a conductive material (the SD metal, in general) on a surface of the etch stop layer 113 between the connecting hole 1133 located above the common electrode line 16 and the connecting hole 1133 located above the common electrode 12, so as to connect each common electrode 12 to the common electrode line 16, and to connect a plurality of common electrodes 12 to each other as well. Specifically, a material for forming the active layer 112 may be Indium Gallium Zinc Oxide (thereinafter, referred to as IGZO).

Figure 3:
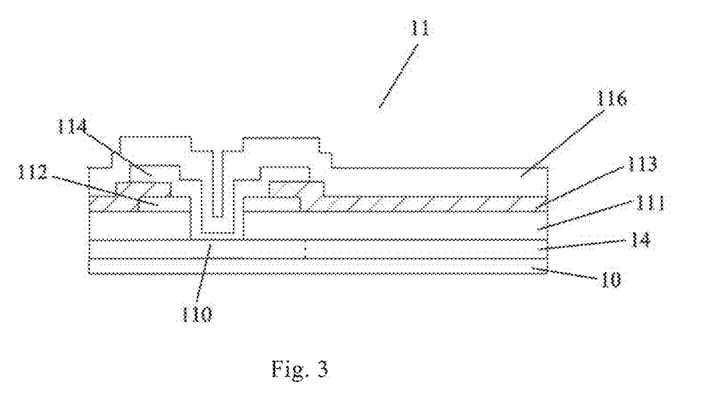
FIG. 3 is a schematic diagram illustrating that an ESL hole is broken down.

In forming the above-mentioned array substrate 1, the substrate 10 will be subject to friction, movement, adsorption, pressure, separation, heating and cooling continuously, and as a result, static electricity is generated on the substrate 10, that is, a large amount of electrostatic charges accumulate on the surface of the substrate 10. Under certain circumstance, a large amount of static electricity will be released, thus resulting in damage to some structure(s) on the array substrate 1. For example, in the process of forming the etch stop layer 113 (i.e., ESL mask) through exposure and development, electrostatic discharge will occur, and in the process of etching the etch stop layer 113 to obtain the ESL holes and the connecting holes 1133, intensity of the electrostatic discharge will be further increased, which may result in abnormal ESL holes and connecting holes 1133. Furthermore, static electricity generated between the gate 110/gate line 14 and the active layer 112 will discharge at the ESL holes (the source holes 1130 and the drain hole 1131) to damage structures at the ESL holes. Also, static electricity generated between the conducting wire connecting the common electrode 12 to the common electrode line 16 and the common electrode 12/the common electrode line 16 will discharge at the connecting holes 1133. In this case, sources of the static electricity discharging at the ESL holes and at the connecting holes 1133 are different, and therefore, the intensities of electrostatic discharge at the connecting holes 1133 and the ESL holes may differ significantly, and therefore, a relatively large voltage difference may exist between a connecting hole 1133 and the ESL hole closest to said connecting hole 1133. In this case, the connecting hole 1133 and the ESL hole actually form a capacitor, and as a result of the relatively large voltage difference, both of the holes are more likely to be broken down, which will generally cause the ESL hole closest to the connecting hole 1133 to be abnormal. As shown in FIG. 3, if the active layer 112 and the gate insulation layer 111 at the ESL hole are broken down, in the subsequent manufacturing process, SD metal will be deposited on the gate 110 when depositing the SD metal into said ESL hole. That is to say, the source 114 or drain 115 is short-circuited with the gate 110, and this will result in a bright line or gradient bright line that is generally horizontal, vertical or crosswise, on the ADS display device, thereby influencing product quality and lowering product yield.

SUMMARY OF THE INVENTION

The present invention intends to at least solve one of the technical problems existing in the prior art, and provides an array substrate, a manufacturing method thereof, a display panel and a display device. In the array substrate, the source hole and the drain hole can be avoided from being broken down by static electricity, so as to avoid a short circuit between the gate and the source/drain as well as the defect caused thereby.

To achieve the object of the present invention, according to one aspect of the present invention, there is provided an array substrate, comprising thin film transistors, common electrodes, common electrode lines, data lines and gate lines, wherein the thin film transistor comprises a gate, an active layer corresponding to the gate, a protective layer corresponding to the gate line or the gate and an etch stop layer, the active layer and the protective layer are provided in the same layer and separated from each other;

the etch stop layer is provided with a source hole and a drain hole both corresponding to the active layer, a protective hole corresponding to the protective layer but not overlapping with the data line, and connecting holes respectively corresponding to the common electrode and the common electrode line; and a distance between each connecting hole and the protective hole closest thereto is smaller than that between said connecting hole and the source hole or the drain hole which is closest to the connecting hole, and/or, a diameter of the protective hole is smaller than those of the source hole and the drain hole.

In each thin film transistor, an area of the protective layer is smaller than that of the active layer.

In each thin film transistor, there are a plurality of source holes provided in the etch stop layer.

In each thin film transistor, there are one or more protective holes provided in the etch stop layer.

Further, in each thin film transistor, the number of the protective holes provided in the etch stop layer is 2 to 5.

The source hole, the drain hole and the protective hole all penetrate through the etch stop layer.

According to another aspect of the present invention, there is provided a manufacturing method of an array substrate, comprising: steps of manufacturing thin film transistors, common electrodes, common electrode lines, data lines and gate lines, wherein, each thin film transistor comprises a gate, an active layer corresponding to the gate, a protective layer corresponding to the gate line or the gate, and an etch stop layer, the active layer and the protective layer are provided in the same layer and separated from each other; the etch stop layer is provided with a source hole and a drain hole both corresponding to the active layer, and connecting holes respectively corresponding to the common electrode and the common electrode line; and the manufacturing method of an array substrate further comprises:

forming, in the etch stop layer, a protective hole corresponding to the protective layer but not overlapping with the data line; wherein, a distance between each connecting hole and the protective hole closest thereto is smaller than that between said connecting hole and the source hole or the drain hole which is closest to the connecting hole, and/or, a diameter of the protective hole is smaller than those of the source hole and the drain hole.

It should be understood that, there is no necessary order in which the above steps of manufacturing thin film transistors, common electrodes, common electrode lines, data lines and gate lines and the step of forming protective holes in the etch stop layer are performed, for example, operations of forming the common electrodes, the common electrode lines, the data lines, the gate lines, etc., may be performed alternately with operations for manufacturing the thin film transistors, and the operation of forming the protective holes may be performed simultaneously with the operation of forming the source holes and drain holes.

According to still another aspect of the present invention, there is provided a display panel, comprising an array substrate, a color filter substrate and a liquid crystal layer provided between the array substrate and the color filter substrate, wherein the array substrate is the above-mentioned array substrate provided by the present invention.

According to yet another aspect of the present invention, there is provided a display device, comprising a display panel, which is the above-mentioned display panel provided by the present invention.

The present invention can achieve the beneficial effects as follows:

The array substrate provided by the present invention comprises a protective layer provided in the same layer as the active layer, and a protective hole is provided in an area of the etch stop layer corresponding to the protective layer; the diameter of the protective hole is smaller than those of the source hole and the drain hole provided in an area of the etch stop layer corresponding to the active layer, so that charges accumulated on the protective layer and the gate/gate line and charges accumulated on the gate/gate line and the active layer are more likely to discharge through the protective hole, than to discharge through the source hole and the drain hole, and thus the source hole and the drain hole are prevented from being broken down. Alternatively, the distance between each connecting hole and the protective hole is smaller than that between the connecting hole and the source hole/drain hole, so that a capacitor with a relatively large voltage difference is formed between the connecting hole and the protective hole, instead of between the connecting hole and the source hole or drain hole that is closest to said connecting hole, in this way, charges accumulated on the gate/gate line and the common electrode are more likely to discharge in the protective hole and the connecting hole, than to discharge in the connecting hole and the source hole or drain hole closest thereto, and thus the source hole or the drain hole that is closest to the connecting hole can be prevented from being broken down by the static electricity. In addition, the protective hole is provided in an area of the etch stop layer not overlapping with the data line, that is, there is no connection between the protective hole and the data line, and therefore, in this case, even if the protective hole is broken down by static electricity, the gate will not be short-circuited with the source and the drain. Therefore, in the array substrate provided by the present invention, a short circuit between the gate and the source/drain as well as the defect caused thereby can be avoided.

In the manufacturing method of an array substrate provided by the present invention, breakdown of the source hole and the drain hole caused by electrostatic discharge can be avoided in the process of manufacturing the array substrate, so as to avoid a short circuit between the gate and the source/drain as well as the defect caused thereby in the subsequent process.

In the display panel provided by the present invention, breakdown of the source hole and the drain hole caused by electrostatic discharge can be avoided in the process of manufacturing the array substrate, so as to avoid a short circuit between the gate and the source/drain as well as the defect caused thereby in the subsequent process.

In the display device provided by the present invention, a short circuit between the gate and the source/drain as well as the defect caused thereby can be avoided.

BRIEF DESCRIPTION OF THE DRAWINGS

The accompanying drawings, which constitute a part of the specification, are used for providing a further understanding of the present invention, and are used for explaining the present invention together with the following specific implementations, rather than limiting the present invention. In the drawings.

DETAILED DESCRIPTION OF THE EMBODIMENTS

Specific implementations of the present invention will be described in detail below in conjunction with the accompanying drawings. It should be understood that, the specific implementations described herein are merely used for describing and explaining the present invention, rather than limiting the present invention.

Figure 4:
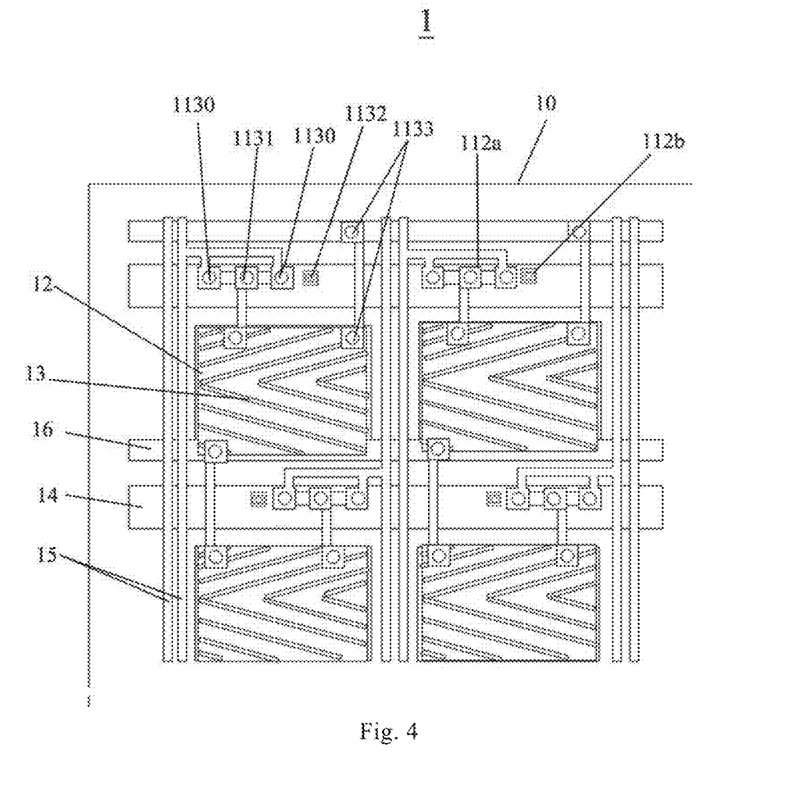
FIG. 4 is a schematic top view of a first implementation of an array substrate provided by the present invention.
Figure 5:
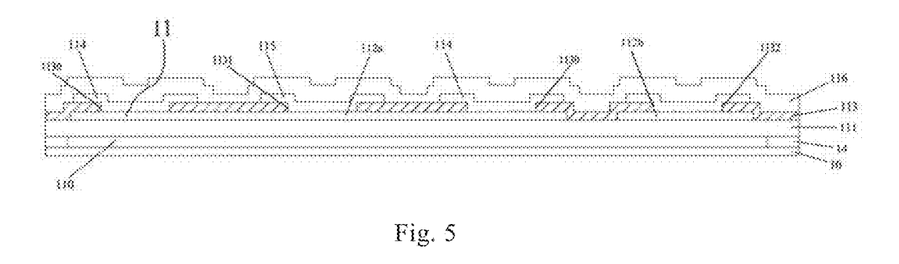
FIG. 5 is a schematic partially cross-sectional diagram of a thin film transistor of the array substrate shown in FIG. 4.

Referring to FIGS. 4 and 5, FIG. 4 is a schematic top view of a first implementation of an array substrate provided by the present invention; FIG. 5 is a schematic partially cross-sectional diagram of a thin film transistor of the array substrate shown in FIG. 4. In this implementation, the array substrate 1 includes a substrate 10 and thin film transistors 11, common electrodes 12, pixel electrodes 13, gate lines 14, data lines 15 and common electrode lines 16 provided on the substrate 10. The data line 15 is configured to supply a voltage to the pixel electrode 13; the common electrode line 16 is configured to supply a voltage to the common electrode 12, and an electric field for controlling liquid crystal molecules to rotate is generated based on the voltages applied onto the pixel electrode 13 and the common electrode 12; the gate line 14 is configured to supply a voltage to the thin film transistor 11 to turn on or turn off the thin film transistor 11, so that the data line 15 supplies a voltage to pixel electrodes 13 located in different rows.

The thin film transistor 11 includes a gate 110, a gate insulation layer 111, an active layer 112a, a protective layer 112b, an etch stop layer 113, an source, 114, a drain 115 and a passivation layer 116, wherein the active layer 112a and the protective layer 112b are provided in the same layer and are separated from each other. In the present invention, the so-called "provided in the same layer" means being simultaneously formed with the same material layer through one process in manufacturing. Furthermore, the active layer 112a is necessarily located at a position corresponding to the gate 110 (with the gate insulation layer 111 provided therebetween, of course), and the protective layer 112b is arranged at a position corresponding to the gate 110 or the gate line 114.

Taking FIG. 4 as an example, the gate 110, the gate insulation layer 111, the active layer 112a, the etch stop layer 113 and the source 114 are sequentially provided on a surface of the substrate 10 in a direction away from the substrate 10, the protective layer 112b and the active layer 112a are provided in the same layer, and the source 114 and the drain 115 are provided in the same layer. In this implementation, in the portion of the etch stop layer 113 corresponding to the active layer 112a (i.e., the region of the etch stop layer 113 positioned directly above the active layer 112a in FIG. 5), source holes 1130 and a drain hole 1131 both penetrating through the etch stop layer 113 are provided. The source 114 and the drain 115 can be obtained by depositing a source-drain metal (SD metal) into the source holes 1130 and the drain hole 1131, respectively. In the portion of the etch stop layer 113 corresponding to the protective layer 112b (corresponding to the gate 110 or the gate line 14, of course) but not overlapping with the data line 15 (i.e., the region of the etch stop layer 113 positioned directly above the protective layer 112b in FIG. 5), a protective hole 1132, which preferably penetrates through the etch stop layer 113, is provided, and the diameter of the protective hole 1132 is smaller than those of the source hole 1130 and the drain hole 1131. In the portion of the etch stop layer 113 corresponding to the common electrode 12 and the common electrode line 16 (i.e., the region of the etch stop layer 113 positioned directly above the common electrode 12 and the common electrode line 16 in FIG. 5), connecting holes 1133 penetrating through the etch stop layer 113 and the gate insulation layer 111 are provided. A conducting wire can be formed by depositing a conductive material (the SD metal, in general) into every connecting hole 1133 and onto the surface of the etch stop layer 113 between the connecting holes 1133 respectively corresponding to the common electrode 12 and the common electrode line 16, so as to connect every common electrode 12 to the common electrode line 16.

In this implementation, since the thin film transistor 11 includes the active layer 112a and the protective layer 112b provided in the same layer, when static electricity is generated in the process of manufacturing the array substrate 1, a first capacitor is formed between the gate 110/gate line 14 and the active layer 112a, and a second capacitor is formed between the gate 110/gate line 14 and the protective layer 112b, wherein the gate 110/gate line 14 serves as first electrodes of the two capacitors, and the active layer 112a and the protective layer 112b serve as second electrodes of the first and second capacitors, respectively. Meanwhile, because the diameter of the protective hole 1132 provided in the etch stop layer 113 and corresponding to the protective layer 112b is smaller than those of the source holes 1130 and the drain hole 1131 provided in the etch stop layer 113 and corresponding to the active layer 112a, in the first capacitor formed between the gate 110/gate line 14 and the active layer 112a and the second capacitor formed between the gate 110/gate line 14 and the protective layer 112b, charges accumulated on the gate 110/gate line 14 (i.e., the first electrodes of the first and second capacitors), the active layer 112a (i.e., the second electrode of the first capacitor) and the protective layer 112b (i.e., the second electrode of the second capacitor) are more likely to discharge through the protective hole 1132 corresponding to the protective layer 112b, than to discharge through the source holes 1130 and the drain hole 1131 corresponding to the active layer 112a. Moreover, as the protective hole 1132 is provided in the area of the etch stop layer 113 not overlapping with the data line 15, that is, the protective hole 1132 is not connected to the data line 15. In this case, when charges accumulated on the gate 110/gate line 14 and the protective layer 112b are more likely to discharge through the protective hole 1132, even if the protective hole 1132 is broken down, the gate 110 will not be short-circuited with the source 114 and the drain 115.

In the meanwhile, in a case where charges accumulated on the gate 110/gate line 14 decrease, the charges accumulated on the gate 110/gate line 14 (i.e., the first electrode of the first capacitor) and the active layer 112a (i.e., the second electrode of the first capacitor) may transfer to the second capacitor and discharge through the protective hole 1132, thus, the charges accumulated on the gate 110/gate line 14 and the active layer 112a can be prevented from discharging through the source holes 1130 and the drain hole 1131 both corresponding to the active layer 112a, that is, breakdown of the source holes 1130 and the drain hole 1131 can be avoided, and further, the defect caused by a short circuit between the gate 110 and the source 114/the drain 115 can be avoided.

Preferably, in this implementation, the area of the protective layer 112b is smaller than that of the active layer 112a. It can be known from the following formula (1) that, the electric field intensity in the second capacitor formed between the gate 110/gate line 14 and the protective layer 112b is larger than that in the first capacitor formed between the gate 110/gate line 14 and the active layer 112a. That is to say, more charges are accumulated on both electrodes of the second capacitor, which reduces the charges accumulated on both electrodes of the first capacitor, and as a result, the charges on the electrodes of the first capacitor can be further prevented from discharging through the source holes 1130 and the drain hole 1131 corresponding to the active layer 112a to break down the source holes 1130 and the drain hole 1131.

$$E \propto 1/\in S \quad (1)$$

where E is the electric field intensity in a capacitor, $\in$ is the dielectric constant, and S is the facing area of electrodes of the capacitor.

Preferably, in this implementation, in each thin film transistor 11, there are a plurality of source holes 1130 provided in the etch stop layer 113, for example, the number of the source holes 1130 is 2 to 5, and in this way, a W/L ratio (i.e., width to length ratio of a channel) can be improved. Preferably, as shown in FIG. 4, the number of the source holes 1130 is two, and the two source holes 1130 are arranged at both sides of the drain hole 1131, respectively.

Figure 6:
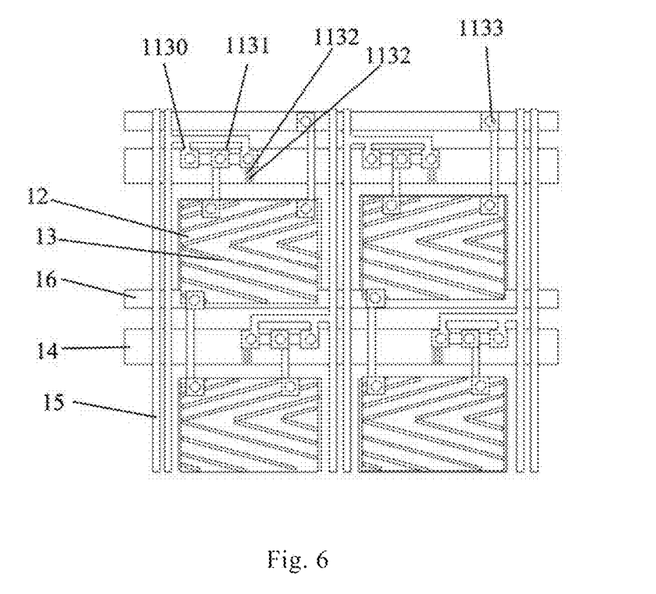
FIG. 6 is a schematic top view of an array substrate in which a plurality of protective holes are arranged in a column.
Figure 7:
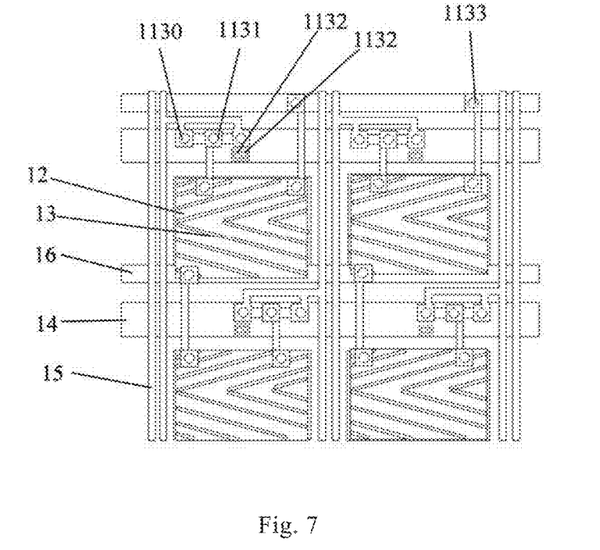
FIG. 7 is a schematic top view of an array substrate in which a plurality of protective holes are arranged in a row.

In this implementation, in each thin film transistor 11, there are one or more protective holes 1132 provided in the etch stop layer 113. In actual application, when the amount of charges accumulated on the gate 110/gate line 14, the active layer 112a and the protective layer 112b is relatively small, only one protective hole 1132 may be provided to discharge static electricity; when the amount of charges accumulated on the gate 110/gate line 14, the active layer 112a and the protective layer 112b is relatively large, a plurality of protective holes 1132 may be provided to discharge static electricity, so as to ensure that the charges accumulated on the gate 110/gate line 14 and the active layer 112a will not discharge through the source holes 1130 and the drain hole 1131. Specifically, when there are a plurality of protective holes 1132, the plurality of protective holes 1132 may be arranged in row(s) or column(s), as shown in FIGS. 6 and 7.

In this implementation, description is given by taking a case where the common electrode 12 is a plate electrode, and the pixel electrode 13 is a slit electrode as an example. In this implementation, electric fields can be generated at edges of the slit electrodes and between the slit electrodes and the plate electrodes, so as to generate a multi-dimensional electric field, which enables the liquid crystal molecules positioned between the slit electrodes to rotate according to the electric field, and thus transmissivity of light passing through the liquid crystal layer is improved and a relatively wide angle of view is achieved.

In this implementation, the material of the active layer 112a and the protective layer 112b is Indium Gallium Zinc Oxide (thereinafter, referred to as IGZO). Compared with traditional amorphous silicon (a-Si) material, IGZO has higher carrier mobility, which can greatly improve charge and discharge rate of the pixel electrode 13. Accordingly, the response speed of the pixels can be improved and a higher refresh rate is realized.

In this implementation, there are two data lines 15 provided between two adjacent columns of pixels, and each one of the two data lines 15 supplies a voltage signal to the pixels located at one side thereof. Specifically, as shown in FIG. 4, between each group of two data lines 15 arranged between two adjacent columns of pixels and another group of data lines 15 adjacent thereto, there is one column of pixels, the data line 15 positioned at one side of the column of pixels supplies a voltage signal to odd-numbered pixels in the column of pixels only, and the data line 15 positioned at the other side of the column of pixels supplies a voltage signal to even-numbered pixels in the column of pixels only. Alternatively, between each group of two data lines 15 arranged between two adjacent columns of pixels and another group of data lines 15 adjacent thereto, there may be two columns of pixels, the data line 15 positioned at one side of the first and second columns of pixels supplies a voltage signal to the first column of pixels at odd-numbered rows and supplies a voltage signal to the second column of pixels at even-numbered rows, and the data line 15 positioned at the other side of the first and second columns of pixels supplies a voltage signal to the second column of pixels at odd-numbered rows and supplies a voltage signal to the first column of pixels at even-numbered rows.

Figure 8:
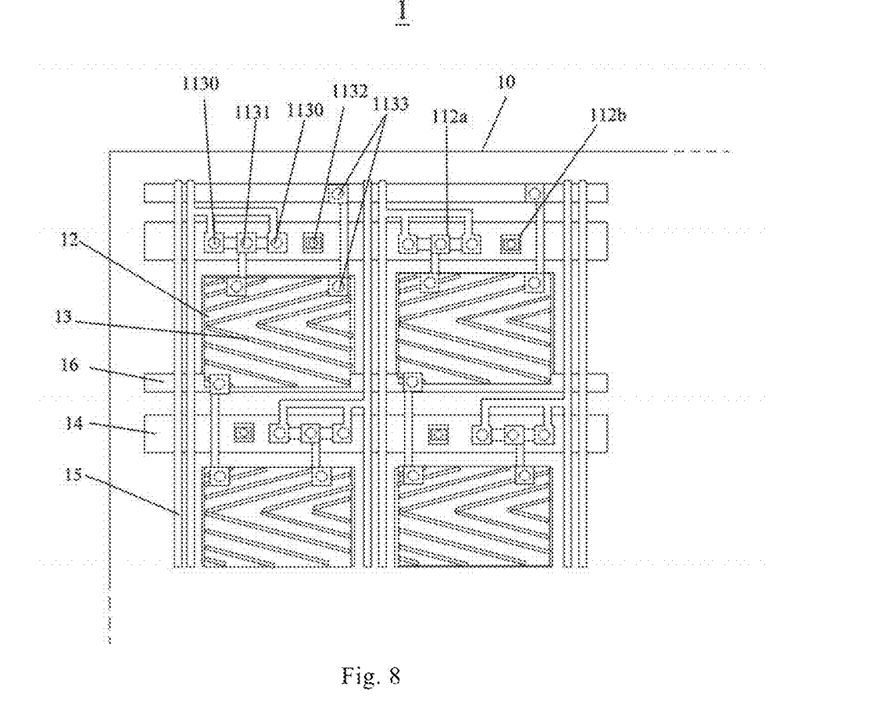
FIG. 8 is a schematic top view of a second implementation of an array substrate provided by the present invention.

FIG. 8 is a schematic diagram of a second implementation of an array substrate provided by the present invention. As shown in FIG. 8, in the second implementation of the array substrate 1, the array substrate 1 also includes a substrate 10 and thin film transistors 11, common electrodes 12, pixel electrodes 13, gate lines 14, data lines 15 and common electrode lines 16 provided on the substrate 10, the thin film transistor 11 also includes a gate 110, a gate insulation layer 111, an active layer 112a, a protective layer 112b, an etch stop layer 113, a source 114, a drain 115 and a passivation layer 116, and as these structures have been described in detail in the above first implementation, and are not described repeatedly herein.

Thereinafter, only the differences between the second implementation and the above first implementation of the array substrate 1 are described in detail. In this implementation, the distance between the protective hole 1132 and the connecting hole 1133 is smaller than that between the connecting hole 1133 and the source hole 1130/drain hole 1131. In this way, a capacitor with a relatively large voltage difference can be formed between the protective hole 1132 and the connecting hole 1133, instead of between the connecting hole 1133 and the source hole 1130 or drain hole 1131 that is closest to said connecting hole 1133, which allows charges accumulated on the gate 110/gate line 14 and the common electrode 12 to discharge in the protective hole 1132 and the connecting hole 1133, instead of discharging in the connecting hole 1133 and the source hole 1130 or drain hole 1131 which is closest to the connecting hole 1133, thus the source hole 1130 or the drain hole 1131 closest to the connecting hole 1133 can be avoided from being broken down by the static electricity, and a short circuit between the gate 110 and the source 114/the drain 115 at the source hole 1130 or the drain hole 1131 can be prevented.

Of course, in this implementation, the diameter of the protective hole 1132 may also be equal to or smaller than those of the source hole 1130 and the drain hole 1131, as shown in the first implementation. When the diameter of the protective hole 1132 is smaller than those of the source hole 1130 and the drain hole 1131, the charges accumulated on the gate 110/gate line 14 and the active layer 112a will not discharge through the source hole 1130 and the drain hole 1131 corresponding to the active layer 112a. In the meanwhile, as described above, since the capacitor formed between the source hole 1130/the drain hole 1131 and the connecting hole 1133 has a relatively small voltage difference, the source hole 1130 and the drain hole 1131 will not be broken down by static electricity, and thus a short circuit between the gate 110 and the source 114/the drain 115 as well as the defect caused thereby can be prevented.

The array substrate 1 provided by the present invention comprises a protective layer 112b provided in the same layer as the active layer 112a, a protective hole 1132 is provided in an area of the etch stop layer 113 corresponding to the protective layer 112b, the diameter of the protective hole 1132 is smaller than those of the source hole 1130 and the drain hole 1131 provided in an area of the etch stop layer 113 corresponding to the active layer 112a, so that charges accumulated on the protective layer 112b and the gate 110/gate line 14 and charges accumulated on the gate 110/gate line 14 and the active layer 112a are more likely to discharge through the protective hole 1132, than to discharge through the source hole 1130 and the drain hole 1131, and thus the source hole 1130 and the drain hole 1131 are prevented from being broken down; alternatively, the distance between each connecting hole 1133 and the protective hole 1132 is smaller than those between the connecting hole 1133 and the source hole 1130 and the drain hole 1131, so that a capacitor with a relatively large voltage difference is formed between the connecting hole 1133 and the protective hole 1132, instead of between the connecting hole 1133 and the source hole 1130 or drain hole 1131 that is closest to said connecting hole 1133, in this way, charges accumulated on the gate 110/gate line 14 and the common electrode 12 are more likely to discharge in the protective hole 1132 and the connecting hole 1133, than to discharge in the connecting hole 1133 and the source hole 1130 or drain hole 1131 which is closest to said connecting hole 1133, and thus the source hole 1130 or the drain hole 1131 closest to the connecting hole 1133 can be prevented from being broken down by the static electricity; in addition, the protective hole 1132 is provided in an area of the etch stop layer 113 not overlapping with the data line 115, that is, there is no connection between the protective hole 1132 and the data line 15, and therefore, in this case, even if the protective hole 1132 is broken down by static electricity, the gate 110 will not be short-circuited with the source 114 and the drain 115. Therefore, in the array substrate 1 provided by the present invention, a short circuit between the gate 110 and the source 114/drain 115 as well as the defect caused thereby can be avoided.

As another aspect of the present invention, there is provided a manufacturing method of an array substrate. In this implementation, the manufacturing method of an array substrate comprises:

steps of manufacturing thin film transistors 11, common electrodes 12, pixel electrodes 13, gate lines 14, data lines 15 and common electrode lines 16, wherein, the thin film transistor 11 comprises a gate 110, a gate insulation layer 111, an active layer 112a, a protective layer 112b and an etch stop layer 113, a portion of the etch stop layer 113 corresponding to the active layer 112a is provided with source holes 1130 and a drain hole 1131 therein, and portions of the etch stop layer 113 corresponding to the common electrode 12 and the common electrode line 16 are provided with connecting holes 1133. The manufacturing method further comprises: forming a protective hole 1132 in an area of the etch stop layer 113 corresponding to the protective layer 112b but not overlapping with the data line 15; wherein, the distance between the protective hole 1132 and the connecting hole 1133 is smaller than those between the connecting hole 1133 and the source hole 1130 and between the connecting hole 1133 and the drain hole 1131, and/or, the diameter of the protective hole 1132 is smaller than those of the source hole 1130 and the drain hole 1131.

It should be understood that, the above description merely indicates that the steps of forming the above respective structures and the steps of forming the respective holes in the etch stop layer 113 are included in the manufacturing method of an array substrate provided by the present invention, but does not limit the order in which the steps are performed, nor the order in which the components required to be formed in each step are formed. For example, the gate 110, the common electrode 12 and the common electrode line 16 may be formed in one process; for another example, the source hole 1130, the drain hole 1131, the protective hole 1132 and the connecting hole 1133 in the etch stop layer 113 may be formed simultaneously, and the source 114 and the drain 115 are then formed after these holes are formed, thus completing the manufacturing of the thin film transistor 11.

Figure 9:
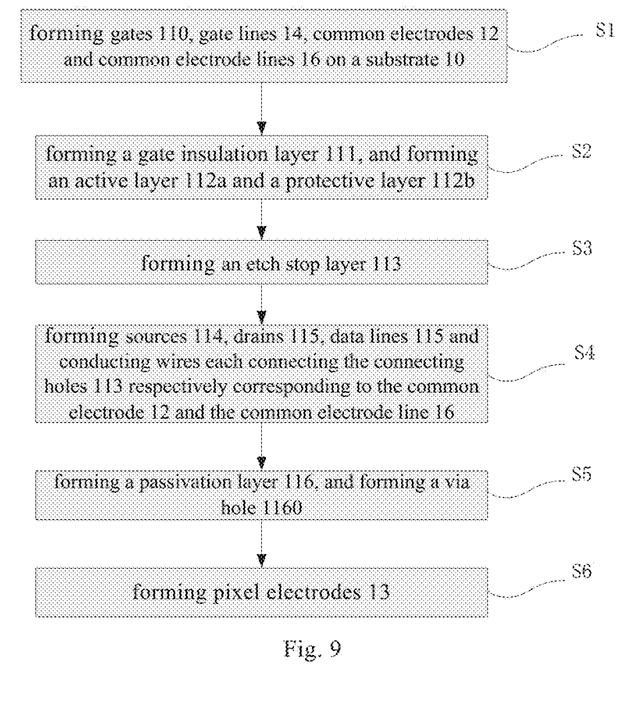
FIG. 9 is a flowchart of a preferred implementation of a manufacturing method of an array substrate provided by the present invention.

Specifically, a preferred manufacturing method of an array substrate 1 is provided below, and FIG. 9 is a flowchart of the manufacturing method. As shown in FIG. 9, according to an order in which the individual units in the array substrate 1 are formed, the manufacturing method of an array substrate 1 comprises steps as follows.

Step S1, gates 110, gate lines 14, common electrodes 12 and common electrode lines 16 are formed on a substrate 10.

Figure 10:
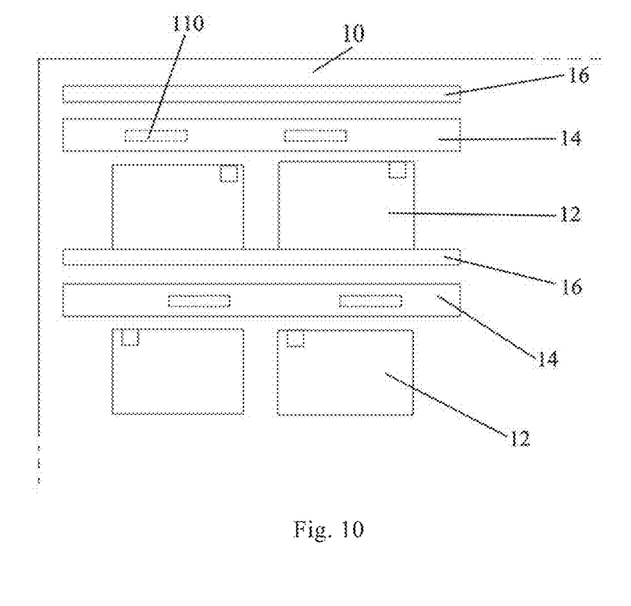
FIG. 10 is a schematic top view of forming a gate, a gate line, a common electrode and a common electrode line on a substrate.

In this step, at first, one layer of Indium Tin Oxide (ITO) and one layer of gate metal are sequentially deposited on the substrate 10, then, one layer of photoresist is coated on the layer of gate metal, and subsequently, the gates 110, the gate lines 14, the common electrodes 12 and the common electrode lines 16 are formed on the substrate 10 through one exposure, developing, multiple etchings and stripping, as shown in FIG. 10. Specifically, different exposure areas are formed through one mask-exposure process, and then multiple removal processes such as etching, ashing and the like are performed on different exposure areas to obtain the desired pattern. Generally, a transflective mask such as a gray-tone mask or half-tone mask may be adopted, in order to form different exposure areas through one mask-exposure process.

Figure 16:
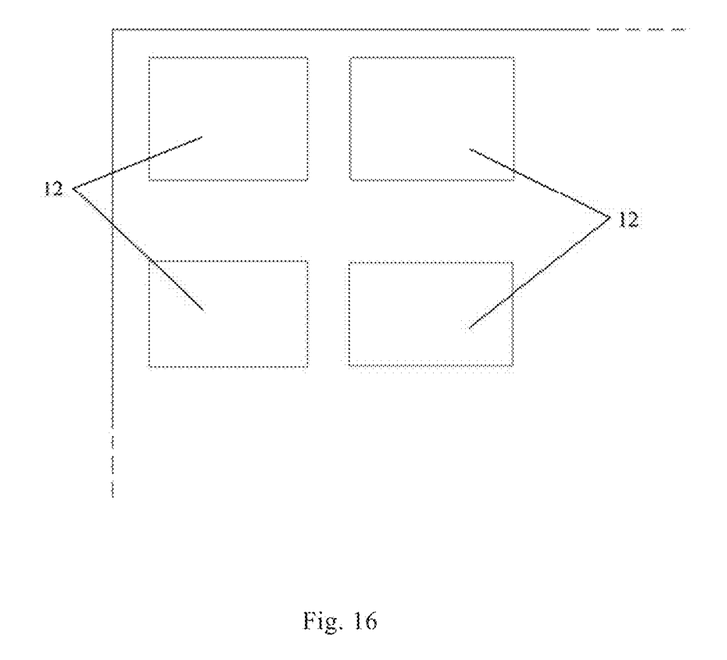
FIG. 16 is a schematic top view of forming a common electrode on the substrate.
Figure 17:
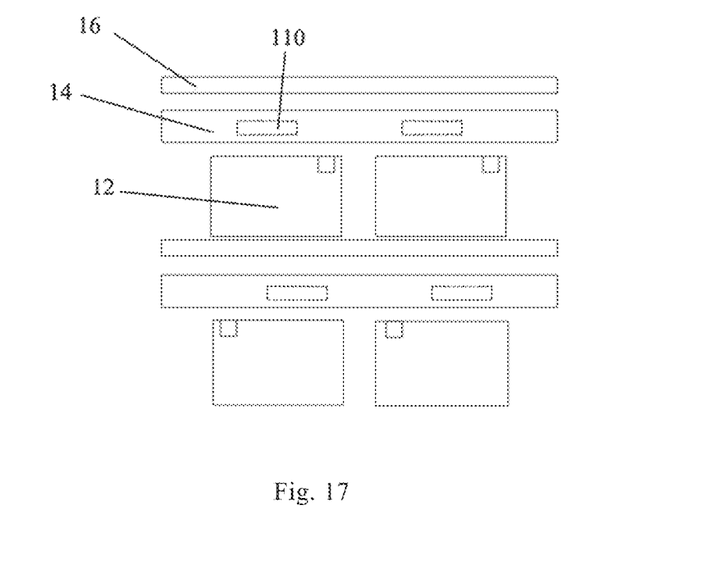
FIG. 17 is a schematic top view of forming a gate, a gate line and a common electrode line on the substrate.

Specifically, the above step S1 may be divided into steps S10 and S11, in step S10, the common electrodes 12 on a surface of the substrate 10 may be obtained through deposition, exposure, developing, etching and stripping, as shown in FIG. 16; in step S11, the gates 110, the gate lines 14 and the common electrode lines 16 are obtained, on the pattern formed on the surface of the substrate 10, through deposition, exposure, developing, etching and stripping, as shown in FIG. 17.

Step S2, a gate insulation layer 111 is formed, and an active layer 112a and a protective layer 112b are formed.

Figure 11:
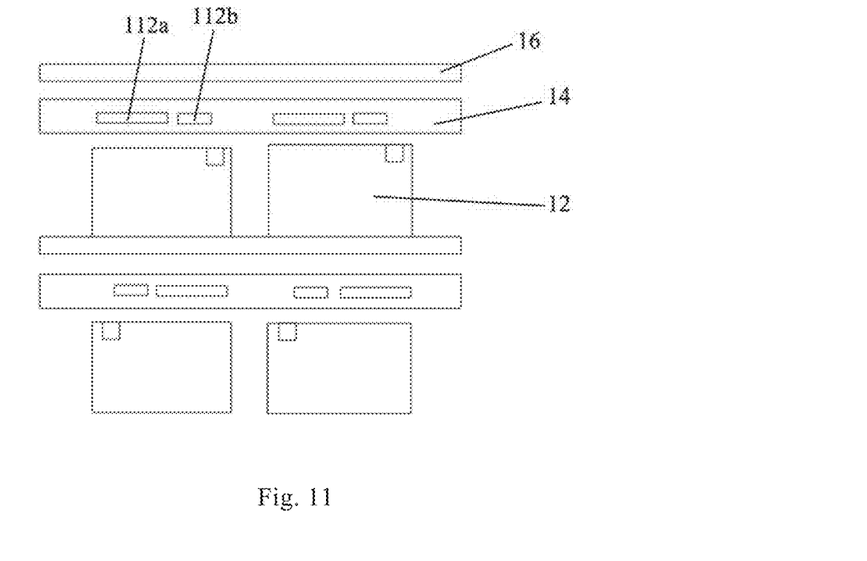
FIG. 11 is a schematic top view of forming an active layer and a protective layer on the substrate.

In this step, at first, the gate insulation layer 111 is obtained, on the pattern that has been formed on the surface of the substrate 10, through deposition; then, the active layer 112a and the protective layer 112b are formed on the gate 110/the gate line 14 through deposition, photoresist coating, exposure, developing, etching, stripping, etc., as shown in FIG. 11. Preferably, the materials of the active layer 112a and the protective layer 112b are IGZO.

Step S3, an etch stop layer 113 is formed.

Figure 12:
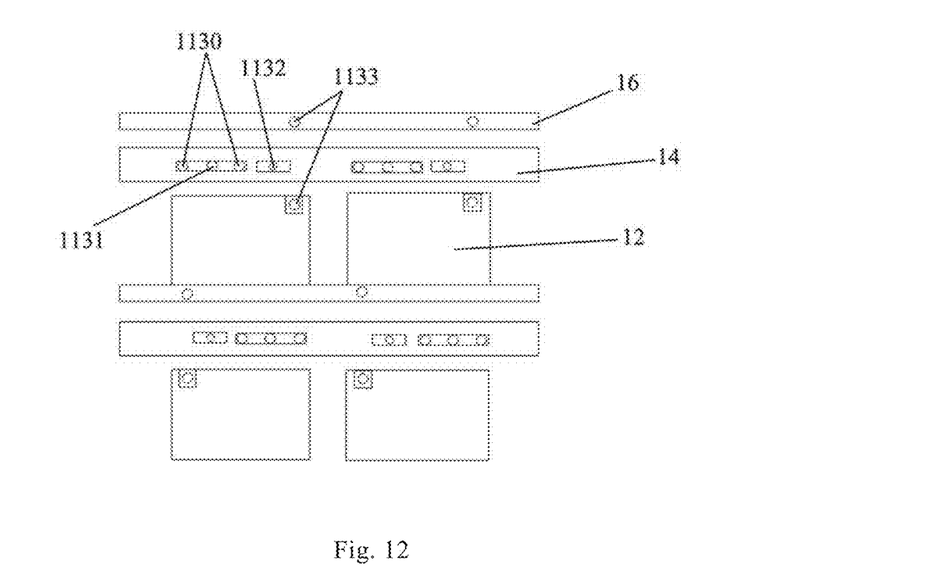
FIG. 12 is a schematic top view of forming an etch stop layer as well as source holes, a drain hole, a protective hole and connecting holes on the substrate.

In this step, on the pattern that has been formed on the surface of the substrate 10, the etch stop layer 113 is formed through deposition, then through processes such as photoresist coating, exposure, developing, etching, stripping and the like, source holes 1130 and a drain hole 1131 are formed in an area corresponding to the active layer 112a, a protective hole 1132 is formed in an area corresponding to the protective layer 112b, and connecting holes 1133 are formed in areas corresponding to the common electrode 12 and the common electrode line 16, as shown in FIG. 12. The source holes 1130, the drain hole 1131 and the protective hole 1132 penetrate through the etch stop layer 113, and the connecting holes 1133 penetrate through the etch stop layer 113 and the gate insulation layer 111. Preferably, there are two or more source holes 1130.

Step S4, sources 114, drains 115, data lines 115 and conducting wires each connecting the connecting holes 113 respectively corresponding to the common electrode 12 and the common electrode line 16 are formed.

Figure 13:
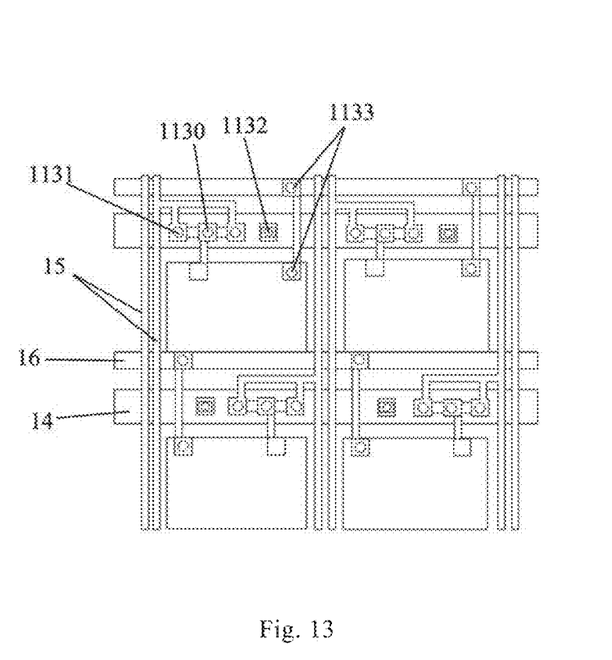
FIG. 13 is a schematic top view of forming a source, a drain, a data line and a conducting wire on the substrate.

In this step, on the pattern that has been formed on the surface of the substrate 10, through processes such as deposition, photoresist coating, exposure, developing, etching, stripping and the like, SD metal is deposited in the source holes 1130 and the drain hole 1131, respectively, to obtain the source 114 and the drain 115; one layer of SD metal is deposited in an area corresponding to the data line 15 to obtain the data line 15; the SD metal is deposited in each connecting hole 1133 and on the surface of the etch stop layer 113 between the connecting holes 1133 respectively corresponding to the common electrode 12 and the common electrode line 16, to form the conducting wire connecting the common electrode 12 and the common electrode line 16, as shown in FIG. 13. In the present invention, the position where the data line 15 is formed may refer to the position where a data line of a thin film transistor in the prior art is formed, and is not specifically limited in the present invention, as long as the formed data line 15 does not overlap with the protective hole 1132 while achieving its function.

Step S5, a passivation layer 116 is formed, and a via hole 1160 is formed.

Figure 14:
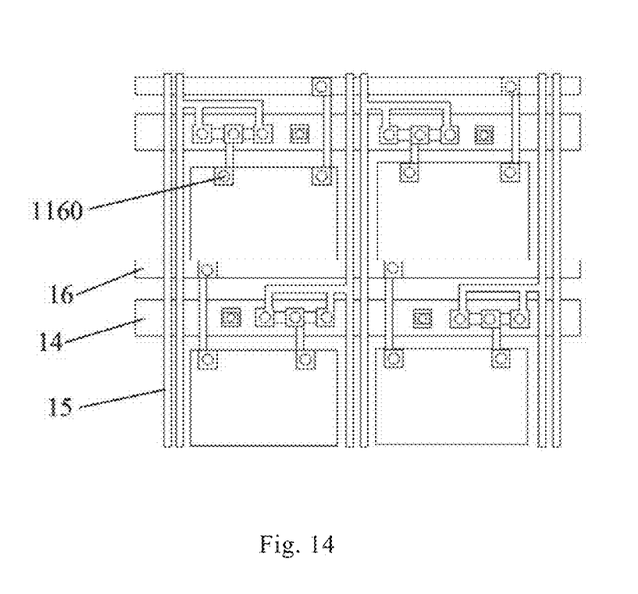
FIG. 14 is a schematic top view of forming a passivation layer and a via hole on the substrate.

In this step, the passivation layer 116 is formed on the pattern that has been formed on the surface of the substrate 10; then, the via hole 1160 is formed in the passivation layer 116 through exposure, developing, etching and stripping, as shown in FIG. 14.

Step S6, pixel electrodes 13 are formed.

Figure 15:
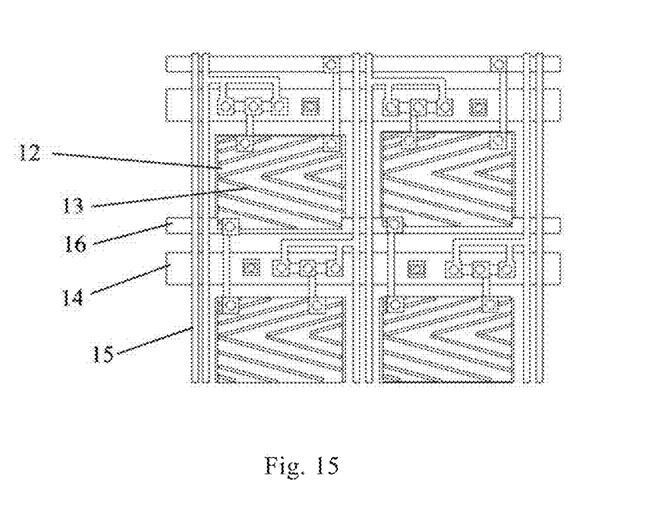
FIG. 15 is a schematic top view of forming a pixel electrode on the substrate.

In this step, one layer of ITO is deposited on the pattern that has been formed on the surface of the substrate 10, then, the pixel electrode 13 is performed through exposure, developing, etching and stripping, as shown in FIG. 15

In the manufacturing method of an array substrate provided by the embodiment of the present invention, breakdown of the source hole 1130 and the drain hole 1131 caused by electrostatic discharge can be avoided in the process of manufacturing the array substrate 1, so as to avoid a short circuit between the gate 110 and the source 114/drain 115 as well as the defect caused thereby in the subsequent process.

As still another aspect of the present invention, there is provided a display panel, comprising an array substrate, a color filter substrate and a liquid crystal layer provided therebetween, and the array substrate is the above-mentioned array substrate provided by embodiments of the present invention.

In the display panel provided by the embodiment of the present invention, breakdown of the source hole 1130 and the drain hole 1131 caused by electrostatic discharge can be avoided in the process of manufacturing the array substrate 1, so as to avoid a short circuit between the gate 110 and the source 114/drain 115 as well as the defect caused thereby in the subsequent process.

According to yet another aspect of the present invention, there is provided a display device, comprising a display panel, which is the above-mentioned display panel provided by the present invention.

In the display device provided by the embodiment of the present invention, a short circuit between the gate 110 and the source 114/drain 115 as well as the defect caused thereby can be avoided.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. An array substrate, comprising thin film transistors, common electrodes, common electrode lines, data lines and gate lines, wherein each thin film transistor comprises a gate, an active layer corresponding to the gate, a protective layer corresponding to the gate line or the gate, and an etch stop layer, and the active layer and the protective layer are provided in the same layer and separated from each other;

the etch stop layer is provided with a source hole and a drain hole both corresponding to the active layer, a protective hole corresponding to the protective layer but not overlapping with the data line, and connecting holes respectively corresponding to the common electrode and the common electrode line; and a distance between each connecting hole and the protective hole closest thereto is smaller than that between said connecting hole and the source hole or the drain hole that is closest to said connecting hole, and/or, a diameter of the protective hole is smaller than those of the source hole and the drain hole.

2. The array substrate according to claim 1, wherein, in each thin film transistor, an area of the protective layer is smaller than that of the active layer.

3. The array substrate according to claim 2, wherein, in each thin film transistor, there are a plurality of source holes provided in the etch stop layer.

4. The array substrate according to claim 3, wherein, in each thin film transistor, there are one or more protective holes provided in the etch stop layer.

5. The array substrate according to claim 4, wherein, the protective hole penetrates through the etch stop layer.

6. The array substrate according to claim 3, wherein, the protective hole penetrates through the etch stop layer.

7. The array substrate according to claim 2, wherein, in each thin film transistor, the number of the protective holes provided in the etch stop layer is 2 to 5.

8. The array substrate according to claim 7, wherein, the protective hole penetrates through the etch stop layer.

9. The array substrate according to claim 2, wherein, the protective hole penetrates through the etch stop layer.

10. The array substrate according to claim 1, wherein, in each thin film transistor, there are a plurality of source holes provided in the etch stop layer.

11. The array substrate according to claim 10, wherein, in each thin film transistor, there are one or more protective holes provided in the etch stop layer.

12. The array substrate according to claim 11, wherein, the protective hole penetrates through the etch stop layer.

13. The array substrate according to claim 10, wherein, the protective hole penetrates through the etch stop layer.

14. The array substrate according to claim 1, wherein, in each thin film transistor, the number of the protective holes provided in the etch stop layer is 2 to 5.

15. The array substrate according to claim 14, wherein, the protective hole penetrates through the etch stop layer.

16. The array substrate according to claim 1, wherein, the protective hole penetrates through the etch stop layer.

17. A display panel, comprising an array substrate, a color filter substrate and a liquid crystal layer provided between the array substrate and the color filter substrate, wherein the array substrate is the array substrate according to claim 1.

18. A display device, comprising the display panel according to claim 17.

19. A manufacturing method of an array substrate, comprising:

steps of manufacturing thin film transistors, common electrodes, common electrode lines, data lines and gate lines, wherein, each thin film transistor comprises a gate, an active layer corresponding to the gate, a protective layer corresponding to the gate line or the gate, and an etch stop layer, the active layer and the protective layer are provided in the same layer and separated from each other; the etch stop layer is provided with a source hole and a drain hole both corresponding to the active layer, and connecting holes respectively corresponding to the common electrode and the common electrode line; and the manufacturing method of an array substrate further comprises:

forming, in the etch stop layer, a protective hole corresponding to the protective layer but not overlapping with the data line; wherein, a distance between each connecting hole and the protective hole closest thereto is smaller than that between said connecting hole and the source hole or the drain hole that is closest to said connecting hole, and/or, a diameter of the protective hole is smaller than those of the source hole and the drain hole.

* * * * *